Patented Sept. 5, 1922.

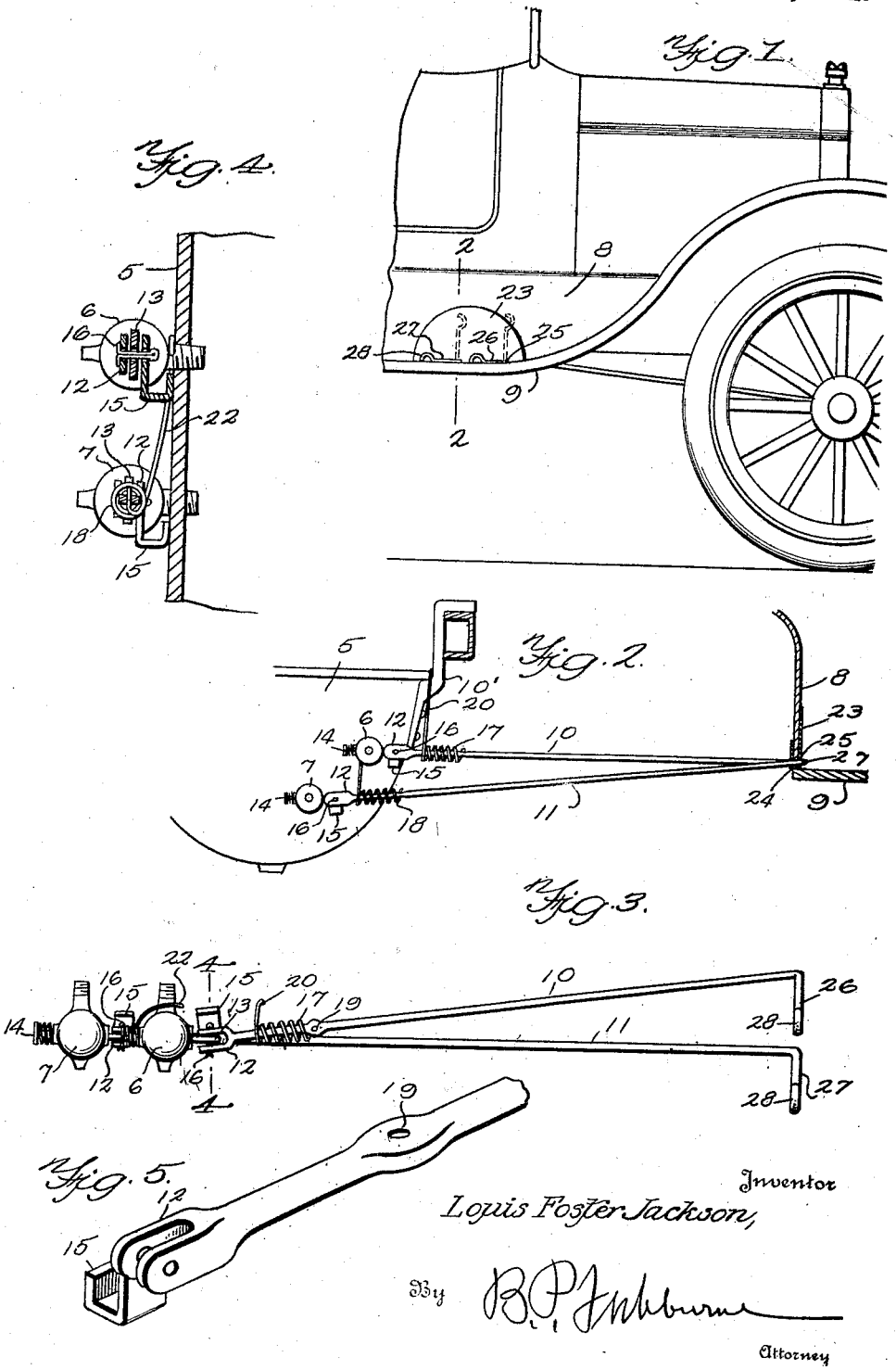

1,427,819

UNITED STATES PATENT OFFICE.

LOUIS FOSTER JACKSON, OF STARKVILLE, MISSISSIPPI.

DEVICE FOR ACTUATING PET COCKS OR VALVES.

Application filed May 23, 1921, Serial No. 471,674. Renewed January 25, 1922. Serial No. 531,821.

*To all whom it may concern:*

Be it known that I, LOUIS FOSTER JACKSON, a citizen of the United States, residing at Starkville, in the county of Oktibbeha and State of Mississippi, have invented certain new and useful Improvements in Devices for Actuating Pet Cocks or Valves, of which the following is a specification.

My invention relates to devices for operating the gauges or pet cocks on automobiles such as the Ford automobile.

An important object of the invention is to provide a device of the above mentioned character, the operating parts of which are rendered accessible, by placing the same in a position between the dust guard and front fender of the automobile.

A further object of the invention is to provide spring means for automatically closing the pet cock and maintaining the same closed, after it has been opened to gauge the oil.

A further object of the invention is to provide a device of the above mentioned character, operating in connection with both pet cocks thereby enabling the user to open the same without getting under the car or the like.

A further object of the invention is to provide a device of the above mentioned character adapted for connection with the head or stem of the pet cock, and which will permit of the relative movements between the body and frame of the automobile, without the binding or breaking of the same.

A further object of the invention is to provide a bearing plate adapted to be inserted between the dust guard and mud guard, for supporting the outer ends of the rods.

A further object of the invention is to provide a device of the above mentioned character, which is simple in construction, strong, durable, and cheap to manufacture.

Other objects and advantages of the invention will be apparent during the course of the following description.

In the accompanying drawings forming a part of this specification, and in which like numerals are employed to designate like parts throughout the same, Fig. 1 is a side elevation of a Ford automobile, showing the device applied thereto, parts of the automobile being broken away, Fig. 2 is a transverse section taken on line 2—2 of Figure 1, parts in elevation.

Fig. 3 is a plan view of the device,

Fig. 4 is a detail section taken on line 4—4 of Figure 3, and,

Fig. 5 is a perspective view of the inner end of one of the rods.

In the drawings, wherein for the purpose of illustration is shown a preferred embodiment of my invention, the numeral 5 designates the crank case of an automobile, such as a Ford automobile, carrying at its rear end pet cocks 6 and 7, to gauge the oil. The numeral 8 is the dust guard and 9 the mud guard, of the usual construction. 10' is a bracket serving to connect the crank case and the frame or chassis of the automobile.

My device embodies a pair of rods 10 and 11, the inner ends of which are provided with forked heads 12 or sockets. These forked heads are adapted to receive therein the heads 13 of the valve stems of the pet cocks, the valve elements being turned by the heads 13, as is obvious. The valve stems are designated by the numeral 14, and project beyond the opposite side of the casing of the pet cock.

Each forked head or socket 12 has one arm thereof provided with a curved stop 15, preferably formed integral therewith, and adapted to abut against the wall of the crank case 5. This stop is designed to engage the crank case when the rod is turned counter-clockwise to close the pet cock. When the valve in each pet cock is closed, the head 13 is arranged vertically, and this head is apertured to receive a pivot element or cotter pin 16, also passing through the end of the forked head or socket 12. It is thus seen that the pivotal connection afforded by the cotter pin and associated elements will permit of the relative vertical movement of the crank case with relation to the dust guard 8 or mud guard 9, and this pivotal joint is provided with sufficient play to permit of slight horizontal movements, so that, it forms in effect a universal joint.

Surrounding the rods 10 and 11 are torsional coil springs 17 and 18 respectively. The one end of each spring extends through an opening 19 in its rod, while opposite ends are extended upwardly from the rod. The portion 20 of the spring 19 has its hooked end 21 engaging over the bracket 10, and the portion 22 of the spring 18 engages over the stem 14 of the pet cock 6. These springs are tensioned to turn the rods counter-clockwise and hold the pet cocks closed, also holding the rods against movement, to prevent rattling.

The numeral 23 designates a bearing plate, which is arranged upon the outer side of dust guard 8, and has a lower flange 24. This flange is passed beneath the lower edge of the dust guard 8 and between it and the mud guard 9 and then bent up. The plate 23 has openings 25, pivotally receiving the outer ends of the rods 10 and 11, these rods being provided with exterior cranks 26 and 27 respectively, having eyes or hooked ends 28, so that they may be conveniently elevated.

In the use of the device, the springs 17 and 18 normally retain the pet cocks closed, and cranks 26 and 27 are horizontal with their ends resting upon the mud guard 9. To open either pet cock, the corresponding crank is elevated, which turns the rod, and this turning movement is transmitted to the valve of the pet cock. As soon as the crank is released the coil spring automatically swings the crank downwardly and closes the valve of the pet cock. The stop 15 is adjustable in the sense that it may be bent, when desired, and this stop will engage the crank case and limit the turning movement of the valve of the pet cock in one direction, whereby the valve is normally retained by the spring in the closed position.

It is to be understood that the form of my invention herewith shown and described, is to be taken as a preferred example of the same, and that various changes in the shape, size, and arrangement of parts may be resorted to without departing from the spirit of my invention or the scope of the subjoined claims.

Having thus described my invention, I claim:

1. In a device of the character described, a rod having a forked head pivotally connected with the head of the stem of a pet cock carried by the crank case of an automobile, a stop element formed upon one side of the forked head and adapted to contact with the crank case and limit the turning movement of the rod in one direction, a tortional coil spring surrounding the rod and having one end secured to the same and its opposite end extending upwardly and engaging over the supporting bracket of the crank case, a bearing plate to be arranged adjacent the dust guard and mud guard of the automobile and having an opening to receive the outer end of the rod, and a crank formed upon the outer end of the rod and adapted to be vertically swung to turn said rod.

2. In a device of the character described, a pair of rods having their inner ends provided with forked heads which are pivotally connected with the ends of the stems of pet cocks carried by the crank case of an automobile, a stop element formed upon one side of each forked end and adapted to contact with the crank case and limit the turning movement of the corresponding rod in one direction, tortional coil springs surrounding said rods and having their outer ends secured to said rods, one spring extending upwardly beyond its rod and engaging with a bracket supporting the crank case and the other spring extending upwardly beyond its rod and engaging with a part of the other pet cock, a bearing plate arranged between the dust guard and mud guard of the automobile and having openings for receiving the other ends of said rods, and cranks formed upon the outer ends of said rods and disposed outwardly of the bearing plates, said cranks having their ends bent into hooks.

In testimony whereof I affix my signature.

LOUIS FOSTER JACKSON.